Oct. 4, 1966   R. J. MELVIN, JR   3,277,248
SWITCH CONTROL UNIT WITH IMPROVED PIVOT ARM ACTUATOR STRUCTURE
Filed July 19, 1965   2 Sheets-Sheet 1

INVENTOR
R. J. Melvin, Jr,
BY R. P. Miller
ATTORNEY

Oct. 4, 1966  R. J. MELVIN, JR  3,277,248
SWITCH CONTROL UNIT WITH IMPROVED PIVOT ARM ACTUATOR STRUCTURE
Filed July 19, 1965  2 Sheets-Sheet 2
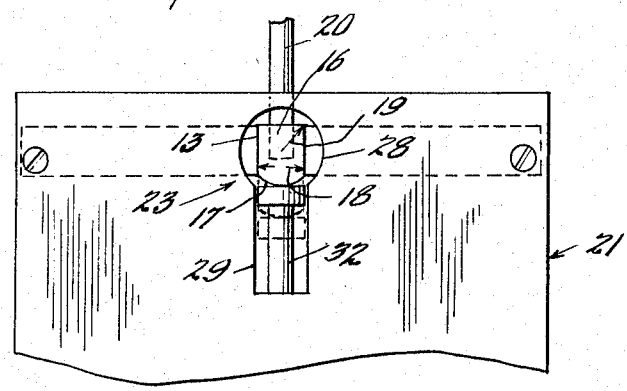
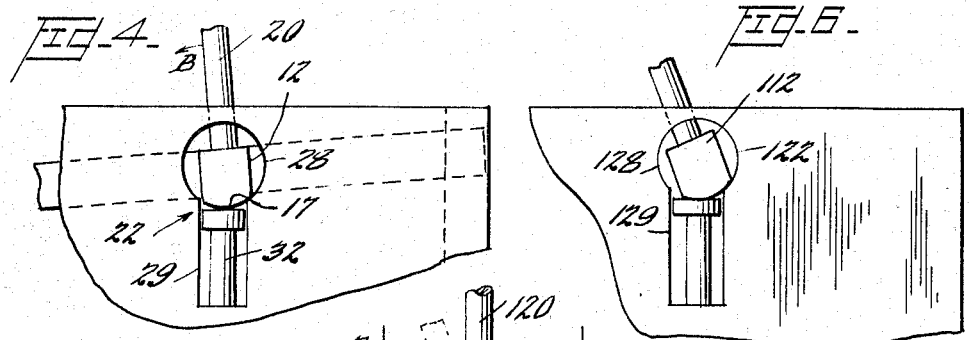
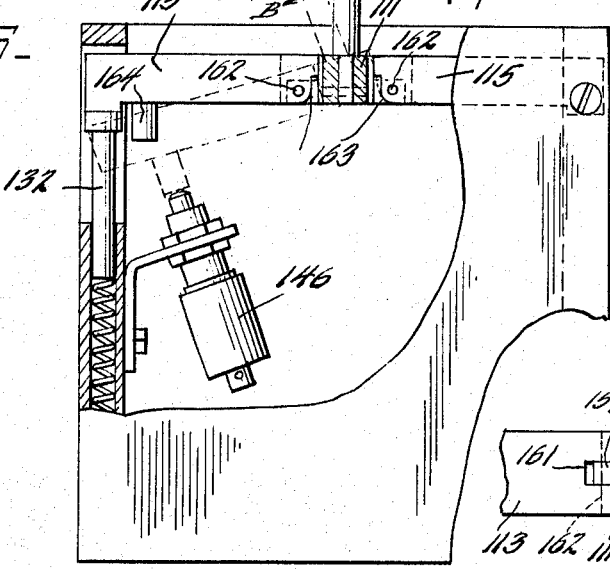
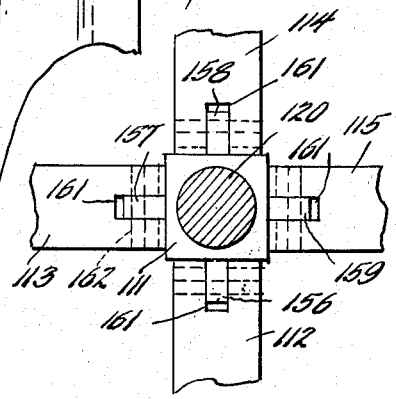

_United States Patent Office_

3,277,248
Patented Oct. 4, 1966

3,277,248
SWITCH CONTROL UNIT WITH IMPROVED PIVOT ARM ACTUATOR STRUCTURE
Raymond J. Melvin, Jr., Burlington, N.C., assignor to Western Electric Company, Incorporated, New York, N.Y., a corporation of New York
Filed July 19, 1965, Ser. No. 473,151
10 Claims. (Cl. 200—6)

This invention relates to a switch control unit with an improved pivot arm actuator structure, and more particularly to a control manipulator that may be pivoted in different directions to selectively operate a plurality of operating units.

In many situations it is frequently desirable to have a control unit which can selectively operate a plurality of operating units by the discriminate movement of a control manipulator. However, in the past, a problem has arisen in designing a control unit which is relatively simple and inexpensive to manufacture, but capable of performing the functions with considerable reliability. In addition, problems have arisen in designing a control unit having a minimum of moving parts, but capable of precluding the actuation of the non-selected units when the selected units are actuated and minimizing the possibility of accidental actuation of an operating unit by the indiscriminated movement of the control manipulator.

An object of this invention is to provide a new and simplified control unit for selectively actuating a plurality of operating units, such as electrical switches.

A further object of the invention resides in an array of radially extending switch actuators together with facilities for pivoting any selected actuator about a pair of actuators into a switch operating position.

An additional object of this invention is to provide a single manipular control unit having a cooperating structure for preventing the actuation of the non-selected operating units when the selected units are actuated and for minimizing the possibility of accidental actuation of a unit by the indiscriminate movement of the manipulator.

A further object of this invention is to provide a control unit having an actuating arm which in a first orientation presents a larger dimension than in a second orientation, so as to preclude pivotal movement in the first orientation while permitting pivotal movement in the second orientation into an operating or control position.

An additional object of the invention is to provide a control unit having four radial actuator arms perpendicularly disposed in which any two arms disposed laterally from a selected arm serve as a pivot for the selected arm.

A further object of this invention is to provide a housing having keyholes formed therein to receive and support therein radially extending actuator arms in which a pair of keyholes precludes pivotal movement of a pair of oppositely disposed rotated arms while permitting the pivotal movement of an intermediate laterally projecting arm.

It is an additional object of this invention to provide a control unit having a pivot structure with four extending hinged arms enabling the structure to pivot one arm in a predetermined direction into a switch operating position without pivoting the other three arms.

With these and other objects in mind, the present invention contemplates a multi-element control unit having a pivot structure comprising a plurality of radial actuator arms mounted on resilient supports so that each selected arm can pivot against its associated resilient support to actuate a switch device while other of the arms are rotated on their resilient supports. More particularly, the pivot structure comprises four radial arms perpendicularly disposed extending into and resiliently supported within the upper enlarged portions of keyholes formed in wall sections of the unit housing. When a control rod connected to the pivot structure is tilted in a selected radial direction corresponding to the direction of a selected arm and a switch device, the structure pivots so that the selected arm is pivoted downwardly, about the two laterally extending arms, against the associated resilient support and into the lower extending portion of the keyhole to actuate the switch device. Simultaneously, the pivoting of the pivot structure rotates the laterally extending arms within their associated keyholes to preclude their movement into the lower extending portion of the keyholes.

Other objects and advantages of the invention will become apparent by reference to the following detailed description and the accompanying drawings illustrating a preferred embodiment thereof, in which:

FIG. 3 is a side view of the control unit showing one of the radial arms extending into and resiliently supported within the upper enlarged portion of its associated keyhole together with a showing of the dimensional relationship of the arm to the upper and lower portions of the keyhole;

FIG. 4 is a front view of the control unit showing one of the laterally extending arms positioned in the upper enlarged portion of the keyhole so as to preclude arm movement into the downwardly extending portion of the keyhole;

FIG. 5 is a cross-sectional view taken along line 2—2 of FIG. 1 of an alternative embodiment showing the pivot structure having arms hinged thereto. The drawing further shows the actuation of one of the switches by the downward movement of one of the arms by a control rod without deflecting the opposing arm;

FIG. 6 is a front view of the alternate embodiment showing a hinged arm rotated within a smaller more confining upper portion of the keyhole so as to preclude downward movement; and FIG. 7 is a fragmentary detailed view taken along line 7—7 of FIG. 5 showing the arms hinged to the pivot structure in the alternate embodiment.

Figure 1:
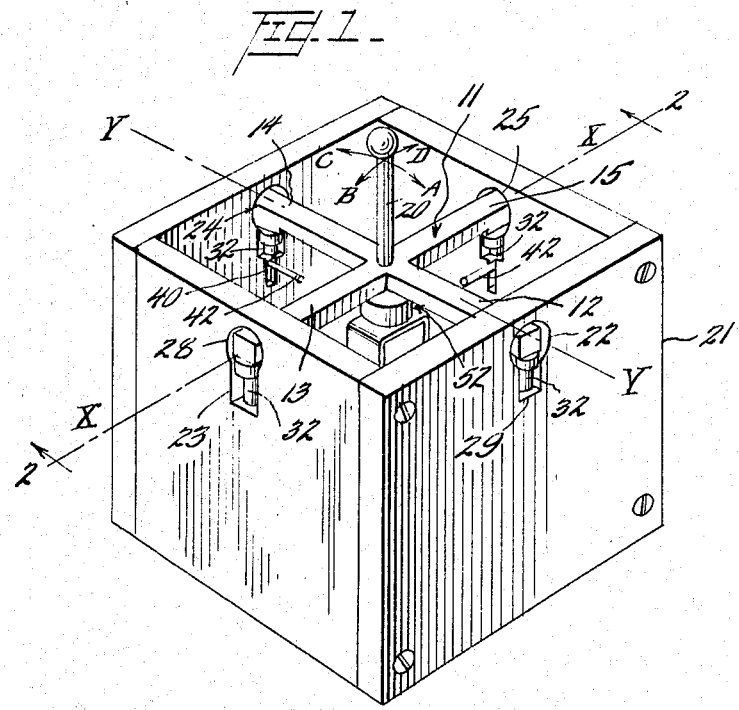
FIG. 1 is a perspective view of a control unit showing a pivot structure having radial arms extending into keyholes formed in a unit housing for selectively operating one of a plurality of electrical switches embodying the principal features of the present invention.

Referring now in detail to the drawings, there is illustrated in FIG. 1, a control unit having a pivot structure or cross members 11 with four actuators or arms 12, 13, 14 and 15 extending radially along two perpendicular intersecting axes X and Y. As shown in FIG. 3, each of the arms has a substantially rectangular cross section 16 except for a convex bottom surface 17. The cross-sectional dimensions of each arm includes a width 18 or first cross-sectional dimension and a diagonal 19 or second cross-sectional dimension. The cross-sectional configuration of each arm is not limited to a rectangle, but may have other shapes that have a greater projected width when rotated, such as an ellipse with a major vertical axis. A vertical control rod or "joy stick" 20 is rigidly connected to the pivot structure 11 at the intersection of the X and Y axes.

The control unit has a four-walled housing 21 circumscribing the pivot structure 11. The walled housing 21 has four slots or keyholes 22, 23, 24, and 25 formed therein and positioned along the axes X and Y to receive the radially extending arms 12, 13, 14 and 15, respectively. As shown in FIG. 3, each of the keyholes has an upper enlarged portion or circular opening 28 and a downwardly extending portion or slot 29. The circular opening 28 is designed to permit an arm to rotate therein by engaging and guiding the convex bottom surface 17 of the arms as illustrated in FIG. 4.

The downwardly extending slot 29 has a width slightly greater than the arm width 18 for guiding the arm into the slot 29 when the arm is pivoted downwardly, but the width of the slot 29 is less than the diagonal 19 for precluding the entry of the arm into the slot 29 when the arm is rotated to present the diagonal to the slot 29 as is shown in FIG. 4.

Figure 2:
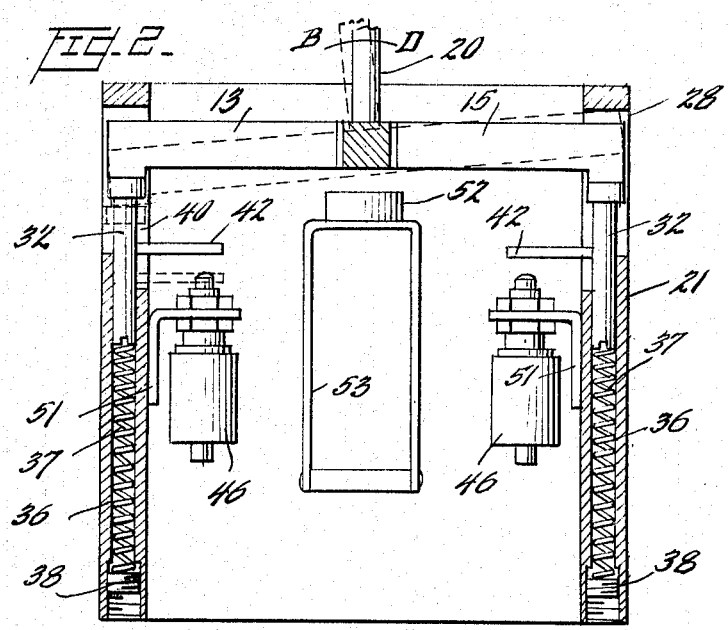
FIG. 2 is a cross-sectional view taken on line 2—2 of FIG. 1 showing a resilient support structure for the switch actuating arms and the corresponding positions of the electrical switches with respect to the actuating arms in the unoperated and operated positions.

The arms 12–15 are supported in the approximate center of the upper enlarged opening 28 of their respective keyholes 22–25 by four vertical support rods 32. The support rods 32 are positioned within vertical channels 36 formed in the walled housing 21. Springs 37 are positioned in the channels 36 below the support rods 32 to resiliently bias the support rod 32 upwardly against arms 12–15 (FIG. 2). Set screws 38 are positioned beneath the springs 37 in threaded portions of the channels 36 for supporting the springs 37 and for adjusting the vertical position of the arms 12–15 within the keyholes 22–25.

Lateral projections or switch operators 42 are attached to the support rods 32, and extend through, and are capable of movemet in slots 40 formed in the inner portions of the walls of housing 21. Electrical switches or operating units 46 are positioned a predetermined distance below the lateral projections 42 to be actuated by downward movement of the lateral projections. These switches are rigidly supported vertically by switch brackets 51 attached to the walled housing 21.

A stop 52 (FIG. 2) is positioned beneath the pivot structure 11 at a distance less than the predetermined distance between the lateral projections 42 and switches 46, so that in the event the control rod is pushed straight down, stop 52 will engage the pivot structure and limit the downward movement of the pivot structure 11 and the arms 12–15, thus preventing the actuation of the switches. Stop 52 is fixed to bracket 53 which is rigidly attached to the walled housing 21.

In operation, assume that it is desired to operate the switch associated with arm 13. The control rod 20 is tilted in the radial direction of arm 13, that is depicted by the letter B, to pivot the pivot structure 11 about the laterally extending arms 12 and 14.

As the structure 11 is pivoted, arms 12 and 14 are moved downwardly slightly, as illustrated in FIG. 4, to lower the pivotal axis of the structure 11 to permit arm 15 greater pivotal movement in opening 28. During this slight downward movement, arms 12 and 14 are rotated to present their diagonals 19 to slots 29 of keyholes 22 and 24, respectively, so that the bottom convex surfaces of arms 12 and 14 will engage and be guided by the circular openings 28 of keyholes 22 and 24. This will preclude the entry of arms 12 and 14 into slots 29, thereby preventing the actuation of their respective switches.

As the structure 11 is pivoted, arm 13 is pivoted downwardly against its support rod to present its width 18 to slot 29 of keyhole 23 enabling arm 13 to enter slot 29 of keyhole 23. As the arm 13 pivots downwardly in slot 29, it further depresses the support rod causing the lateral projection to engage and actuate the associated switch. Meanwhile, arm 15 is pivoted upwardly to eventually engage the ceiling of the circular opening 28 of keyhole 25, as the arm 13 completes the actuation of its associated switch.

When the control rod 20 is tilted in direction A, arm 12 moves down to actuate its corresponding switch and arms 13 and 15 rotate in the upper circular openings of keyholes 23 and 25. When the control rod 29 is tilted in direction C, arm 14 moves down to actuate its corresponding switch and arms 13 and 15 rotate. When the control rod 20 it tilted in direction D, arm 15 moves down to actuate its corresponding switch and arms 12 and 14 rotate.

If the control rod 20 is tilted in any direction other than the four perpendicular directions A, B, C and D, all of the arms 12–15 will slightly rotate or shift to preclude their downward movement thereby preventing actuation of any of the switches.

In an alternate embodiment (FIGS. 5, 6 and 7), a pivot structure 111 has four hinge projections 156–159 extending into end slots 161 of arms 112–115, respectively. Each arm is hinged to the pivot structure by hinge pins 162 extending horizontally through the lower portions of the arm and the hinge projection. Each arm has a lower curved end surface 163 adjacent the pivot structure 111 to enable structure 111 to pivot in one direction without pivoting upwardly the arm extending in the opposite direction. This feature enables the diameter of the circular opening 128 of the keyholes to be reduced to further restrict the movements of the arms extending therein. Furthermore, each arm has a downwardly extending abutment 164 for engaging and actuating an associated switch when the abutment is moved in a prescribed arcuate path.

Support rods 132 are spring-biased to support the arms 112–115 against the upper surface of the keyhole openings 128. Switches 146 are positioned in the arcuate path of the arm abutments and at an angle with the housing to be only engaged and actuated by the arcuate movement of the arm abutments.

In operation, assume that it is desired to actuate the switch associated with arm 113. Control rod 120 is tilted in the radial direction of arm 113, depicted as an arrow lettered B, to pivot structure 111 to move against and pivot arm 113 about hinge pin 162 against support rod 132 to move its abutment in an arc path to engage and acuate its associated switch. As the structure 111 pivots, arms 112 and 114 rotate in their respective circular keyhole openings 128. In view of the hinge mounting of the arm 115 and the rounded end surface 163, the pivoting of structure 111 does not pivot arm 115 within its associated opening 128, but horizontally slides arm 115 within the opening.

In the event that the control rod 120 is pushed straight down instead of being tilted, arms 112–115 move down to engage the bottom of the keyhole slots 129 and the abutments 164 will move down in a vertical path, instead of in the prescribed arcuate path, to miss the switches. These features prevent the accidental actuation of the switches by the downward movement of the control rod.

It is understood that the above-described embodiments are simply illustrative of the application of the principles of this invention. Numerous other arrangements may be readily devised by those skilled in the art which will embody the principles of the invention and fall within the spirit and scope thereof.

What is claimed is:
1. In a selectively operated switching device,
  a pivot structure having four equally spaced radiating arms;
  means for resiliently supporting said arms;
  means for pivoting said structure about two opposed arms to pivot an intermediate arm against its resilient means;
  means rendered effective upon the pivoting of said structure for limiting movement of said opposed arms against their resilient means; and
  switches individually positioned to be operated by the pivoting of each arm.

2. A control unit for selectively operating electrical switches, comprising:
  a plurality of radial arms;
  electrical switches spaced from each of said arms;
  resilient means engaging each of said arms for supporting said arms spaced from said switches;

a control rod connected to the juncture of said arms for selectively pivoting one of said arms downwardly against the engaged resilient means to operate one of said electrical switches; and means rendered effective upon pivoting of said selected arm for engaging certain of the other arms to preclude the actuation of the other switches by the other arms.

3. In a multi-switch control unit, a first pair of spaced switches;

a second pair of spaced switches positioned along a line intersecting a line extending through the first pair of switches;

a pair of cross members for actuating said switches having their extremities overlying the switches;

means interposed between said switches and said extremities for resiliently supporting said cross members;

means for tilting said cross members to move a selected extremity of one of said members against an associated resilient means to operate the associated switch; and means rendered effective during tilting of said cross members for limiting movement against said resilient means by said other extremities.

4. A control unit for selectively operating electrical switches, comprising:

a pivot structure having four radially extending arms;

an electrical switch positioned adjacent each of said arms to be operated by downward movement of said arm;

resilient means for normally maintaining each of said arms spaced from said adjacent switch;

a tiltable control rod fixed to said pivot structure for selectively pivoting one of said arms downwardly to operate said adjacent switch and for rotating the two arms extending laterally from said downwardly moved arm; and means for guiding said selected arm downwardly in response to the tilting of said control rod in the radial direction of said arm and for precluding the downward movement of said rotated arms.

5. In a switching device, a pivot member, four equally spaced arms pivotally mounted on said pivot member;

a housing having four key-shaped holes to receive the extremities of said arms, each of said holes having an enlarged opening and a depending slot;

means for resiliently supporting said extremities in said openings;

means for pivoting said pivot member to engage and move a selected arm against its resilient means into its associated slot while rotating the laterally projecting arms and sliding said remaining arm in their respective openings; and switch means positioned to be operated by an arm pivoting into its associated slot.

6. In a selectively operated switching device, a housing having four key-shaped holes spaced 90° apart, each hole comprising an enlarged opening and a depending slot;

a pivot member;

four arms pivotally mounted on said member and having their extremities projecting into said enlarged openings, each of said arms having a cross-sectional configuration that in a first orientation allows movements of the arm into the depending slots and that in a second orientation precludes entry of the arms into the depending slots;

means for resiliently supporting said arms in said enlarged openings in said first orientation;

means for pivoting said pivot member to engage and move a selected arm against said resilient means into said slot while rotating the laterally projecting non-selected arms into said second orientation, and longitudinally moving the remaining non-selected arm in its enlarged opening; and switches mounted about said housing in position to be operated by the pivoting of an arm.

7. A control unit for selectively operating electrical switches, comprising:

a walled housing having four slots formed therein, each pair of slots being positioned in diametrically opposed walled sections, each of said slots having an enlarged portion and a smaller downwardly extending portion;

a pivot structure having four radial arms extending into the enlarged portions of said slots, each of said arms having a cross-sectional dimension which prevents movement of said arm into the downwardly extending portion of said slot when said arm is rotated to present said cross-sectional dimension to said downwardly extending portion;

an electrical switch adjacent each of said arms and positioned to be operated by the movement of said arm into the downwardly extending portion of said slot;

resilient means for normally maintaining each of said arms spaced from said adjacent switch; and means for pivoting said pivot structure to move one of said arms into the downwardly extending portion of said slot to operate said adjacent switch and for simultaneously rotating in said enlarged portions the two arms extending laterally from said downwardly moved arm to present said cross-sectional dimension to said downwardly extending portions to prevent the movement of said lateral arms into the downwardly extending portions.

8. A control unit for selectively operating electrical switches, comprising:

a pivot structure having four radially extending arms, each of said arms having substantially rectangular cross-sections;

a walled housing circumscribing said pivot structure having four keyholes formed therein to receive the radially extending arms, each of said keyholes having an enlarged opening for guiding the rotation of said arm therein and a smaller downwardly extending slot, the width of which is greater than the width of said arm but less than the diagonal of said arm;

vertical rods slidably mounted in said housing for supporting said arms, each of said rods having a lateral projection;

resilient means for normally biasing said rods to support said arms in the enlarged opening of said keyholes;

switches positioned adjacent to and operated by the lateral projections of said rods when said rods are depressed downwardly by said arms; and a tiltable control rod connected to the central portion of said pivot structure for pivoting said pivot structure to move one of said arms into the downwardly extending slot to depress said vertical rod and associated lateral projection to actuate the adjacent electrical switch and to rotate the arms extending laterally from said downwardly moved arm to present the diagonal of said laterally extending arms to said downwardly extending slots to preclude the movement of said laterally extending arms into said slots.

9. A control unit for selectively operating one of four electrical switches spaced in a uniform circular array, comprising:

a pivot structure having four arms extending over said switches and along two perpendicular intersecting axes, each of said arms having a convex bottom surface and a width less than a diagonal cross-sectional dimension;

a walled housing circumscribing said pivot structure having four keyholes formed therein and positioned along said axes to accommodate the radially extending arms, each of said keyholes having circular enlarged openings for engaging and guiding the convex surface of said arm when said arm is rotated and a smaller downwardly extending slot having a width slightly larger than the width of said arm for guiding said arm into said slot when the arm is moved downwardly and for precluding entry by said arm into said slot when said arm is rotated to present said diagonal of said arm to said slot;

four vertical rods slidably mounted in said housing for supporting said arms;

a lateral projection fixed to each of said rods and extending over a switch for actuating said switch when said rod is depressed by one of said arms;

resilient means for biasing said rods to normally support said arms in the enlarged opening of said keyholes; and a control rod connected to said pivot structure at the intersection of said axes for selectively pivoting said pivot structure about one of said axes to rotate the arms extending along said axis to engage the convex surfaces of said arms with the circular enlarged openings of the associated keyholes and to present said diagonal to said slots, thus precluding the movement of said rotated arms into said slots and for moving an arm extending along the other axis downwardly into its associated slot to depress the associated rod to actuate the associated switch.

10. A switching unit for selectively operating a plurality of electrical circuits, comprising:

four electrical switches positioned below two perpendicular intersecting axes for operating said electrical circuits;

a walled housing surrounding said switches having four keyholes formed therein and positioned along the intersecting axes, each of said keyholes having a circular enlarged opening and a downwardly extending slot;

a pivot structure having four resiliently supported arms radially extending along said axes over said switches and into the enlarged openings of said keyholes, each of said arms having a first cross-sectional dimension that is slightly smaller than the width of said slot and a second cross-sectional dimension that is larger than width of said slot;

hinge means connecting said arms to said pivot structure for enabling said structure to pivot an arm in one direction without pivoting the arm extending in the opposite direction;

a control rod connected to said pivot structure at the intersection of said axes for selectively pivoting said pivot structure in the radial direction of a first hinged arm and about laterally extending second and fourth hinged arms without vertically moving a third hinged arm to rotate said second and fourth arms to present their second cross-sectional dimensions to their associated slots to preclude the movement of said rotated arms into said slots and to downwardly move said first arm to present its first cross-sectional dimension to its associated slot to enter said slot to actuate one of said switches.

References Cited by the Examiner

UNITED STATES PATENTS

| 1,709,068 | 4/1929 | Forseille | 200—6 X |
| 2,622,161 | 12/1952 | Harter. | |
| 2,849,549 | 8/1958 | Elliott | 200—6 |
| 2,984,720 | 5/1961 | Fisher | 200—6 X |

ROBERT K. SCHAEFER, *Primary Examiner.*

KATHLEEN H. CLAFFY, *Examiner.*

J. R. SCOTT, *Assistant Examiner.*